United States Patent [19]
Abrams et al.

[11] Patent Number: 4,546,960
[45] Date of Patent: Oct. 15, 1985

[54] VIBRATION ISOLATION ASSEMBLY

[75] Inventors: Bernard W. Abrams, South Euclid; Donald J. Karbo, Shaker Heights, both of Ohio

[73] Assignee: Gould Inc., Rolling Meadows, Ill.

[21] Appl. No.: 505,742

[22] Filed: Jun. 20, 1983

[51] Int. Cl.$^4$ .................................................. B64C 27/04
[52] U.S. Cl. .................................. 267/136; 248/550; 248/559; 280/707
[58] Field of Search ............ 267/64.28, 64.13, 64.16, 267/35, DIG. 1, 36; 248/562, 550, 566, 559, 638, DIG. 1; 280/6 H, 6 R, 707, DIG. 1; 73/1 DV, 4 R, DIG. 1; 440/52; 188/269, 279, 280, 281, 285

[56] References Cited

U.S. PATENT DOCUMENTS

| | | | |
|---|---|---|---|
| 2,457,712 | 12/1948 | Olson et al. | 179/1 |
| 2,516,338 | 7/1950 | Olson | 179/100.4 |
| 2,964,272 | 12/1960 | Olson | 248/19 |
| 3,606,233 | 9/1971 | Scharton et al. | 248/550 |
| 3,701,499 | 10/1972 | Schubert et al. | 248/550 X |
| 3,995,883 | 12/1976 | Glaze | 280/707 |
| 4,245,854 | 1/1981 | Curnutt | 267/64.28 X |
| 4,342,446 | 8/1982 | Eaton et al. | 267/35 |
| 4,352,487 | 10/1982 | Shtarkman | 267/35 |
| 4,373,744 | 2/1983 | Glaze | 280/707 |
| 4,401,298 | 8/1983 | Eaton et al. | 267/140.1 |
| 4,416,445 | 11/1983 | Coad | 267/35 |

OTHER PUBLICATIONS

"IES Proceedings", Active Vibration Isolation for Flexible Payloads, Apr. 1968, pp. 407-413, Leatherwood and Dixon.
"IES Proceedings", Servo-Controlled Pneumatic Isolators . . . An Advanced Concept for Vibration Isolation, 1965, pp. 73-79, Kunica.
"Institute of Environmental Sciences", Active Vibration Isolation of Aerial Cameras, 1968, pp. 389-398, Pepi.
"Transactions of SAE", Active Vibration and Shock Isolation; Ruzicka; vol. 77, 1968, pp. 2872-2886.

Primary Examiner—George E. A. Halvosa
Assistant Examiner—Robert J. Oberleitner
Attorney, Agent, or Firm—G. P. Edgell; Edward E. Sachs

[57] ABSTRACT

An assembly for adaptively controlling vibration, shock, acceleration and position of an item mounted to the assembly independent of varying operating characteristics of the item or a support base for the assembly is provided. The assembly comprises an item to be controlled, a support platform for supporting the item, a viscous spring damper mechanically intercoupled between the item and the platform, a first accelerometer for sensing vibration, shock, acceleration and position of the item, a second accelerometer for sensing vibration, shock, acceleration and position of the support platform, a gas supply source for selectively supplying gas to the viscous spring damper, a fluid supply source for selectively supplying fluid to the viscous spring damper, and a logic control circuit for adjusting inputs from the gas supply source and the fluid supply source to selectively adjust the operation of the viscous spring damper and the dynamic mechanical coupling of the item to the platform. The invention is particularly applicable as a mechanical coupler system to be used for the support of vibrating machinery on submarines.

8 Claims, 6 Drawing Figures

VIBRATION ISOLATION ASSEMBLY

BACKGROUND OF THE INVENTION

The present invention relates generally to assemblies for controlling mechanical vibration and position. More particularly, it relates to shock absorbers of the type which use both an elastomeric shear spring and the flow of fluid through a restrictive valve for absorbing shock and dissipating energy in combination with apparatus and electronic logic control circuitry for controlling vibration of vibrating structures and vibrations caused elsewhere by vibrating structures, such as machinery.

The invention is particularly applicable as a mechanical coupler control system to be used for the support of items on naval vessels, particularly submarines, which are dependent upon not being acoustically detected at long ranges. However, it will be appreciated to those skilled in the art that the invention can be readily adapted for use in other environments as, for example, where similar vibration and position controlling mechanical coupler systems are employed to support or isolate other types of vibrating items.

The primary acoustic detections of submarines are made on the low frequencies radiated by the submarine hull, since low frequencies are not subject to the absorption experienced by higher frequencies. These low frequencies are produced by the vibrations of various machinery being transmitted through their support mounts and then radiated by the hull. Reduction of the low frequency transmissibility of the machinery support mounts would consequently decrease the probability of detection of submarines.

Various forms and types of mechanical coupler system assemblies have heretofore been suggested and employed, all with varying degrees of success. It has been found that defects present in most prior mechanical coupling assemblies are such that the assemblies themselves are of limited practical value for application in a naval vessel such as a submarine.

One of the conventional vibration isolation schemes involves mounting the vibrating machinery to a spring which is in turn fastened to a support foundation. The characteristics of the spring are selected to effect an optimal compromise between static deflection and resonant frequency of the system. It is preferred that the static deflection be small to maintain the desired position of the machinery. This requires the spring to be stiff. It is also preferred that the resonant frequency be low, which requires the spring to be compliant. The compromise selected between these two opposing preferences hopefully results in an acceptable static deflection and a resonant frequency somewhat lower than the lowest frequency expected to be generated by the vibrating machinery.

Unfortunately, this compromise is often unsatisfactory in that the resonant frequency cannot be made low enough to effect the desired degree of transmission loss or in that the static deflection is more than can be tolerated.

The present invention contemplates a new and improved assembly which overcomes all of the above referred to problems and others to provide a mechanical coupler control system in which the static deflection and the dynamic compliance are separately selectable, in which the assembly is readily adaptable to a plurality of uses with vibrating items having a variety of dimensional characteristics and which provides improved dynamic coupling operation between a support platform and the vibrating item.

BRIEF SUMMARY OF THE INVENTION

In accordance with the present invention, there is provided an assembly for adaptively controlling vibration, shock, acceleration and position of an item mounted to the assembly independent of the varying operating characteristics of the item or a support platform for the assembly. The assembly comprises a vibrating item to be controlled, a support platform for supporting the item, a viscous spring damper mechanically intercoupled between the item and the platform, first sensing means for sensing vibration, shock, acceleration and position of the item, second sensing means for sensing vibration, shock, acceleration and position of the support platform, a gas supply source for selectively supplying gas to the viscous spring damper, a fluid supply source for selectively supplying fluid to the viscous spring damper, and, logic control means operatively engaged to the first and the second sensing means, the gas supply source and the fluid supply source for comparing vibration, shock, acceleration and position of the item and the support platform. The logic control means adjusts the inputs from the gas supply source and the fluid supply source to selectively adjust the operation of the viscous spring damper and the dynamic mechanical coupling of the item to the support platform.

In accordance with another aspect of the present invention, a selectively controllable servovalve in operative communication between the fluid supply source, the gas supply source and the viscous spring damper is operatively controlled by the logic control means to adjust the gas pressure of said viscous spring damper and the fluid pressure of said viscous spring damper in response to sensed vibration of the vibrating item and the support platform to attenuate vibration, absorb shock, inhibit acceleration, and maintain a preselected position of the item relative to the support platform.

In accordance with a further aspect of the present invention, the logic control means compares an output of the first sensing means and the second sensing means with preselected reference values for selectively operating the servovalve in response to the output of the sensing means.

One benefit obtained by use of the present invention is a control assembly which operates to selectively adjust relative kinetic energy between items coupled to the assembly with respect to amplitude, phase and frequency.

Another benefit obtained by use of the present invention is a vibration control assembly which attenuates the low frequencies generated by vibrating machinery that may be transmitted through support mounts and radiated by a submarine hull to permit acoustic detection of the submarine.

Another benefit obtained from the present invention is a mechanical coupler system which may support an item of vibrating machinery to maintain a preselected necessary position of the machinery while absorbing vibration, shock, acceleration and torque movements inherent in operation of the machinery.

A further benefit of the present invention is an active mechanical coupler control system remotely capable of controlling position, amplitude, acceleration, shock and vibration between a supported item and a supporting platform independent of the varying operating characteristics of the supported item or the supporting platform.

Other benefits and advantages of the subject new vibration control system assembly will become apparent to those skilled in the art upon a reading and understanding of this specification.

BRIEF DESCRIPTION OF THE DRAWINGS

The invention may take physical form in certain parts and arrangements of parts, the preferred embodiment of which will be described in detail in the specification and illustrated in the accompanying drawings which form a part hereof and wherein.

DETAILED DESCRIPTION OF THE INVENTION

Figure 2:
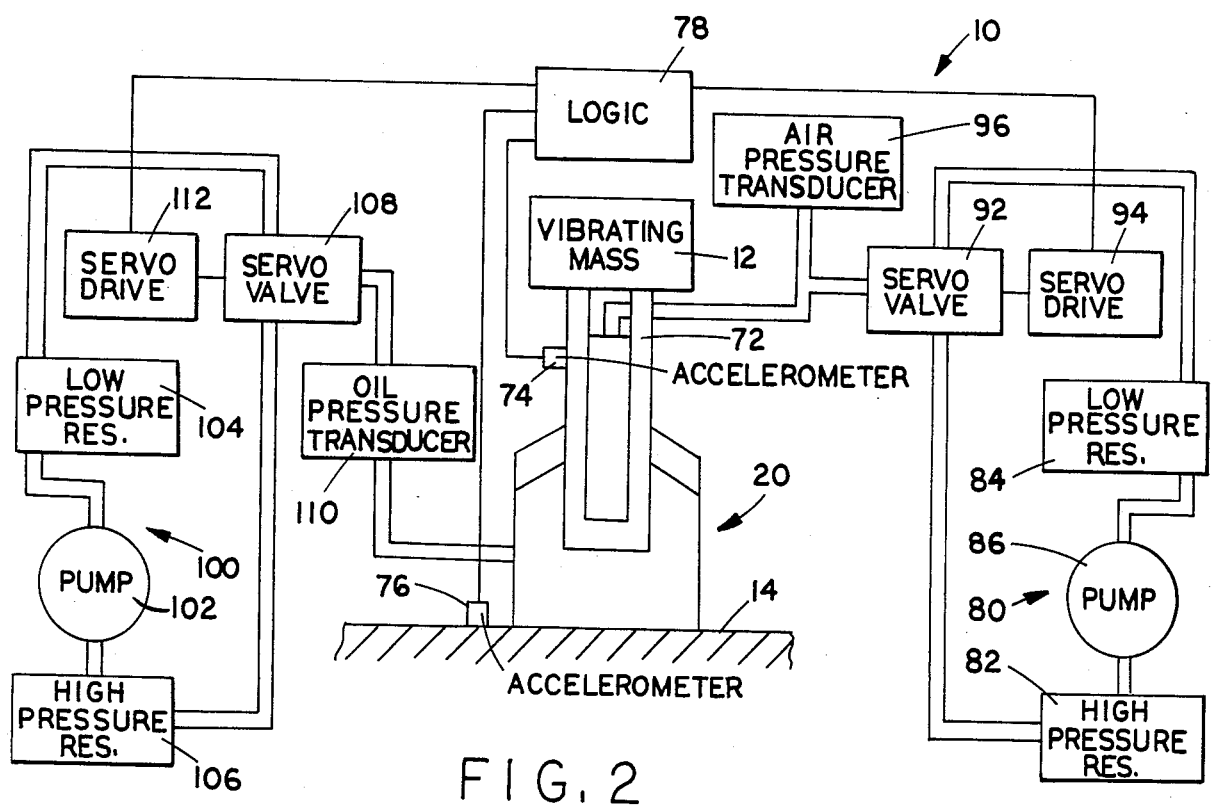
FIG. 2 is a block diagram illustrating an assembly constructed in accordance with the present invention.

Referring now to the drawings which are for purposes of illustrating the preferred embodiment of the invention only and not for purposes of limiting the same, the FIGURES show a control system assembly 10 particularly useful for mechanically coupling a vibrating mass or item 12 and a support platform or base 14 (FIG. 2).

Figure 1:
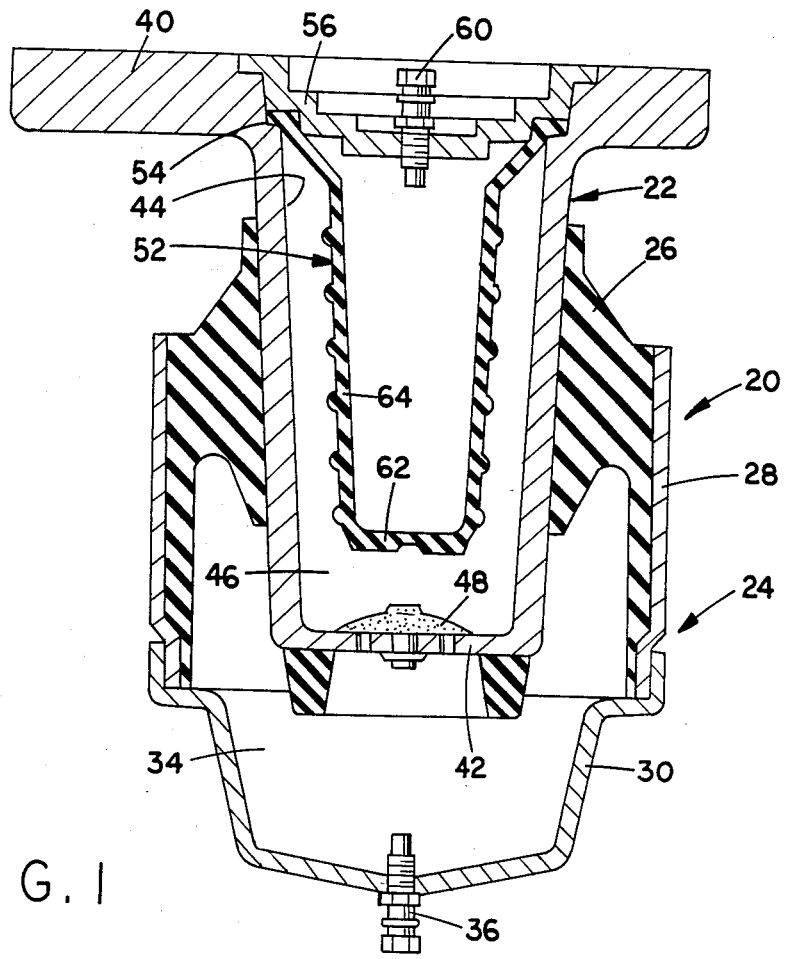
FIG. 1 is a cross-sectional elevational view of a viscous spring damper adapted for use in the practice of the present invention.

More specifically and with reference to FIG. 1, a viscous spring damper 20 is shown including an inner member 22 connected with an outer member 24 by an elastomeric shear spring 26 which is bonded to the surface of the inner and outer members. Outer member 24 includes an outer tube 28 secured to a cap 30. A main fluid chamber 34 is defined between inner and outer members 22 and 24, and elastomeric shear spring 26. A fluid connector 36 is positioned in an opening in end cap 30 to provide for the ingress and egress of fluid to and from main fluid chamber 34. References to a fluid in this application are meant to define a liquid, such as hydraulic fluid.

Inner member 22 includes an outwardly extending mounting flange 40 and an elongated cup-like portion including an end wall 42 having a peripheral wall 44 extending therefrom to enclose an elongated second fluid chamber 46. Restrictor valve 48 is provided for transferring fluid between fluid chambers 34 and 46.

An elongated expandable and contractible elastomeric bladder 52 is positioned within second fluid chamber 46, and has a circumferential mounting flange 54 secured between a circumferential shoulder on inner member 22 and a cap member 56 which is press fit or otherwise suitably secured to an inner member 22. Cap member 56 has a gas connector 60 mounted thereon for the ingress and egress of gas to the bladder 52 for selectively charging the bladder with variable gas pressure. Bladder 52 is shaped to generally conform with the shape of second fluid chamber 46, and includes a bladder end wall 62 facing end wall 42, and a bladder peripheral wall 64 facing inner member peripheral wall 44.

Elastomeric shear spring 26 supports a portion of the item or load being carried by the damper 20 and additionally serves as a seal for main fluid chamber 34 between the inner and outer members 22, 24. The use of the elastomeric shear spring 26 as a seal between the inner and outer members has the advantage over most damping units in that no sliding surfaces are involved. Thus, the durability of the seal is greatly increased in comparison with most commercial units. Additionally, by using an elastomeric shear spring 26, the device can take a degree of conical and torsional misalignment which cannot be tolerated in many other types of damping devices.

The fluid serves a dual purpose in the viscous spring damper 20. First, it tends to distribute the load over a greater portion of the elastomer surface, thus allowing selective design to a higher load capacity than could be achieved with the elastomeric shear spring 26 as a support item by itself. Second, the flow of fluid through the restrictor valve 48 of the inner member 22 gives increased damping. A different damping effect in the opposite directions is produced through the action of the restrictor valve 48. This allows low damping under compressive loads and higher damping as the unit attempts to return to its neutral position.

Figure 4:
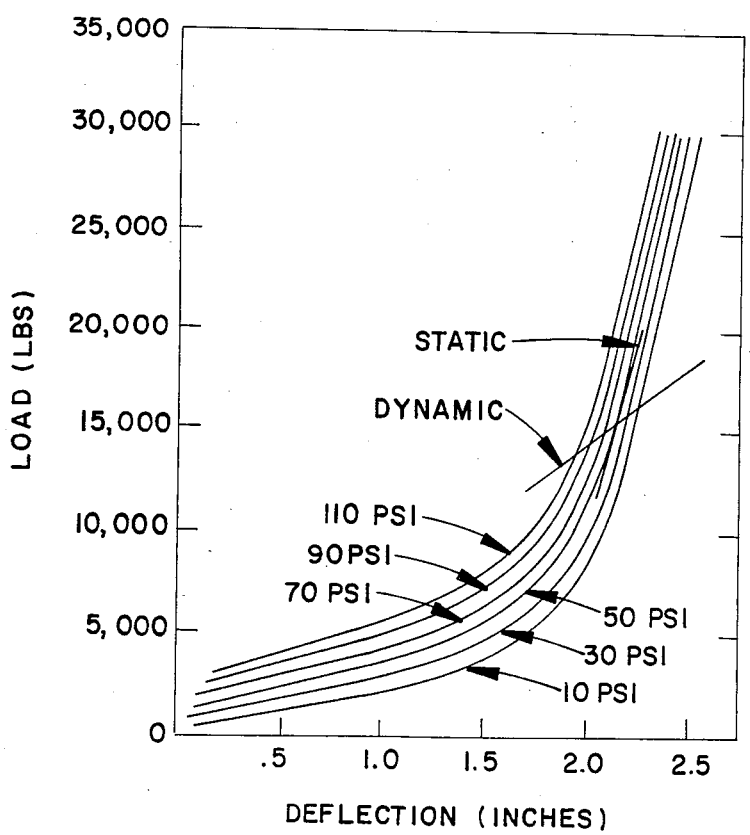
FIG. 4 is a graphic representation of the load/deflection characteristics of a viscous spring damper adapted for use in the practice of the present invention particularly showing the effect on the load by changes in the gas pressure.

Pressurization of the bladder 52 is used to adjust the load/deflection characteristics of the damper 20. With particular reference to FIG. 4, the effect on the deflection per a given load by changes in the gas pressure is illustrated. The capability to adjust the gas pressure allows the viscous spring damper 20 to be set at a given deflection for a particular load within the design limits of the system. The capability to effect this adjustment occasionally or continuously is important in the operation of the invention.

With particular reference to FIG. 2, a block diagram showing the assembly of the preferred embodiment of the invention is shown. An item to be supported by the assembly such as a vibrating piece of machinery is indicated as vibrating mass 12. It is mounted to a frame member 72 which in turn is engaged by viscous spring damper 20. Frame member 72 may be engaged alternatively to either the inner member 22 or the outer member 24 of the damper 20. In the block illustration of FIG. 2, frame member 72 is associated with the inner member 22 containing the elastomeric bladder 52 (FIG. 1). The support platform 14 for the damper 20 may comprise the hull of a submarine or any other ultimate support surface for the vibrating mass 12. The support platform 14 is associatively engaged with the outer member 24 (FIG. 1) of the viscous spring damper 20.

The vibration, shock, torque, movement, acceleration and position of the vibrating mass 12 is sensed by a first sensing means 74. Sensing means 74 is illustrated as being associated with the frame member 72 of the vibrating mass 12; however, the sensing means 74 may be positioned directly on the vibrating mass 12 or in any other manner to sense movement of the mass. In the preferred embodiment of the invention a commercially available accelerometer such as a B&K Model Number 4368 may be satisfactorily employed.

A second sensing means 76 is associated with support platform 14 to additionally sense the movement or vibration of the support platform 14. The second sensing means 76 also preferably comprises an accelerometer. Both accelerometers 74, 76 operatively communicate with a logic control circuit 78 that detects the vibrations of the sensed items for purposes of adjusting the dynamic coupling operation of the viscous spring damper to attenuate vibrations and improve the dynamic coupling operation of the damper, as will hereinafter be more fully explained.

With continued reference to FIGS. 1 and 2, the elastomeric bladder 52 of damper 20 is selectively pressurized from a gas pressure reservoir 80. Gas reservoir 80 generally comprises a high pressure reservoir 82, a low pressure reservoir 84 and a pump 86 to maintain the high pressure reservoir. The low pressure reservoir 84 may merely comprise atmospheric pressure. The gas pressure reservoir operatively communicates with a selectively operable valve, preferably first servovalve 92, which is also operatively communicating to the bladder 52. Gas pressure in the bladder 52 may be selectively adjusted by operation of the servovalve to increase the gas pressure in the bladder 52 or delete the pressure by bleeding off gas from the bladder 52 to the low pressure reservoir 86. Servovalve 92 is operated by a servodrive 94 which in turn is operated by the logic control circuit 78. Air pressure transducer 96 senses the pressure in the bladder 52 and communicates an indicia of the pressure to the logic control circuit 78.

A similar fluid pressure control system is also provided for adjusting the fluid pressure in the fluid chambers of the viscous spring damper 20. A fluid pressure reservoir 100 comprising a pump 102 and a low pressure reservoir 104 and high pressure reservoir 106 serves as a fluid supply source in communication with second servovalve 108. Oil pressure transducer 110 provides an indicia of the oil pressure in the fluid chambers 34, 46 of the damper 20 to the logic control system 78. Servovalve 108 is operated by servodrive 112. Fluid is provided from the fluid source 100 to the fluid chambers 34, 46 through fluid connector 36.

OPERATION

With particular attention to FIGS. 3-6, the improved vibration control characteristics of the invention will be specifically discussed.

Figure 3:
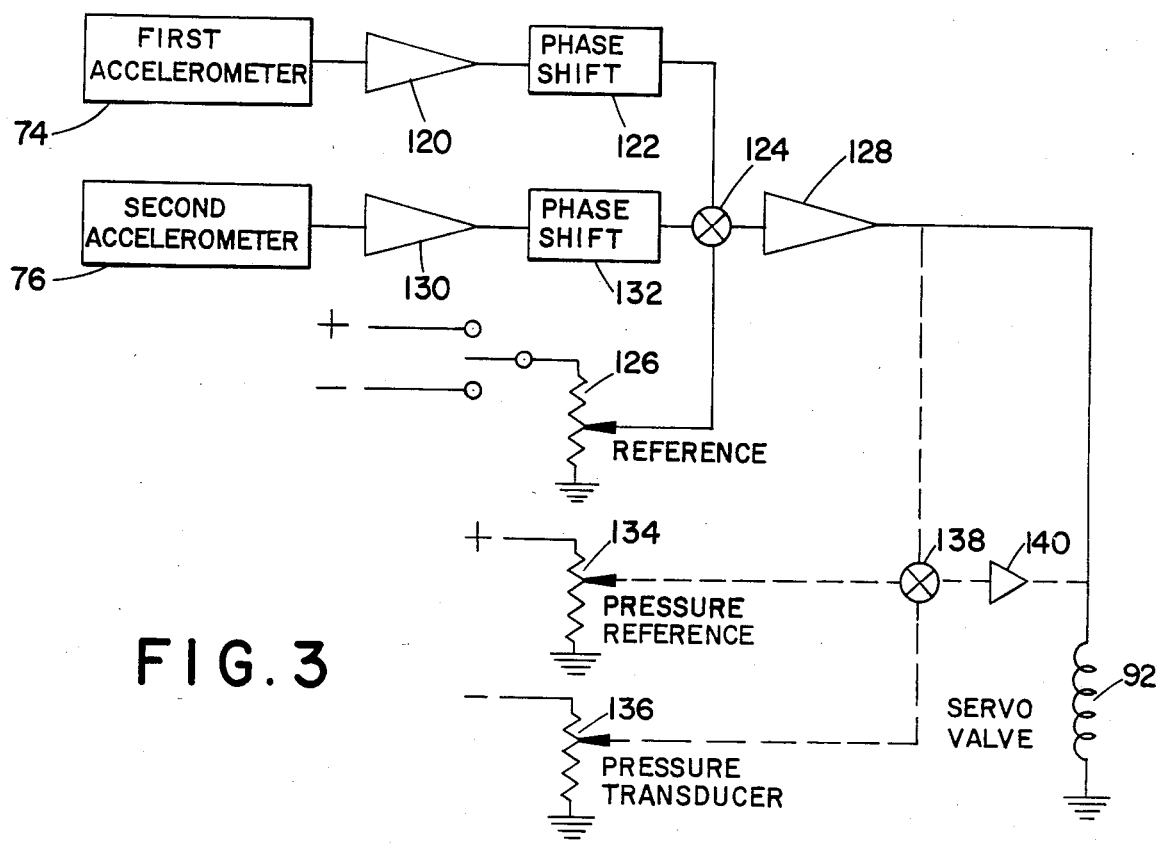
FIG. 3 is a block diagram illustrating a logic control system designed in accordance with the present invention.

With particular attention to FIG. 3, a logic control system to reduce the transmissibility of a vibration mount is shown. A first accelerometer 74 such as may be engaged to a vibrating piece of machinery or a support platform senses the vibration of the item. The output of the first accelerometer 74 is amplified by amplifier 120 and has its phase adjusted by phase shift network 122. The extent of amplification and phase shift is selectively varied as a function of the predetermined frequency requirements of the system. The output of the phase shift network is fed to summing point 124. The adjustable voltage obtainable from the movable contact on a potentiometer 126 whose ungrounded terminal is connectable to either a positive or negative voltage, as is appropriate, may also be provided to the summing point 124 so as to provide an appropriate reference signal. The sum of the signals at summing point 124 is further amplified by amplifier 128 and fed to a servovalve 92, which in turn causes gas to be admitted to or exhausted from the bladder 52 (FIG. 1). The amount of vibration reduction yielded by the system just described may not be adequate to system needs, because the control signal can be reduced only to the level which still provides control. In this case, a second accelerometer 76 mounted in a position alternate to that of the first accelerometer 74 is beneficial. The output of the second accelerometer 76 is amplified by amplifier 130 and has its phase adjusted by phase shift network 132, with the amounts of amplification and phase shift as functions of frequency not necessarily being the same as those associated with the first accelerometer 74. The output of the phase shift network 132 is also provided to the summing point 124. In cases where independent control of the position of the item is an important system characteristic, it may be accomplished by provision of a pressure reference potentiometer 134 and a pressure transducer 136. The outputs of amplifier 128, pressure reference potentiometer 134 and pressure transducer 136 are all fed to summing point 138. The sum of the signals at 138 is amplified by amplifier 140 and fed to the servovalve 92. The dashed lines indicate the alternate connection. The logic control system of FIG. 3 may be used for either the gas reservoir or the fluid reservoir since the principles of operation remain the same regardless of pressure medium. It is within the scope of the invention to include either a first and second logic control system with a first gas pressure assembly and a second fluid pressure assembly, or to combine the logic control circuitry into a single apparatus as illustrated in FIG. 2

With particular reference to FIG. 4, a graphic illustration of the operating characteristics of a viscous spring damper adapted for use in accordance with the present invention is provided. It may be seen that the deflection of the damper will vary dependent upon load applied to the damper and gas pressure contained in the bladder gas chamber. It may be seen that where the gas pressure is static, such as at 50 psi, deflection displacement, according to load, will vary in a typical operating range along the line identified as static. However, where it is possible to dynamically adjust the gas pressure in the bladder 52 in accordance with a varying load in a typical operating range, the deflection per a given load may vary according to a selected gas pressure contained in the bladder 52.

With continued reference to FIG. 4, for example, consider that the viscous spring damper of the invention is intended to support a static load of 15,000 pounds and a dynamic load of 1,500 pounds. If the gas pressure in the bladder gas chamber is held constant at 50 psi, the static deflection is 2.125 inches, while the dynamic deflection varies from 2.080 to 2.170 inches, that is, $2.115 \pm 0.045$ inches. This is equivalent to a spring rate of $6 \times 10^{-5}$ inches/lb. If the pressure in the gas chamber is varied with the load, the dynamic deflection varies from 1.950 to 2.30 inches, i.e., $2.125 \pm 0.175$ inches. This is equivalent to a spring rate of $23.3 \times 10^{-5}$ inches/lb. For a simple system devoid of a dynamically adjustable vibration mount, this difference would lower the resonant frequency by a factor of 1.97 and decrease the transmissibility by about 10 decibels.

Figure 5:
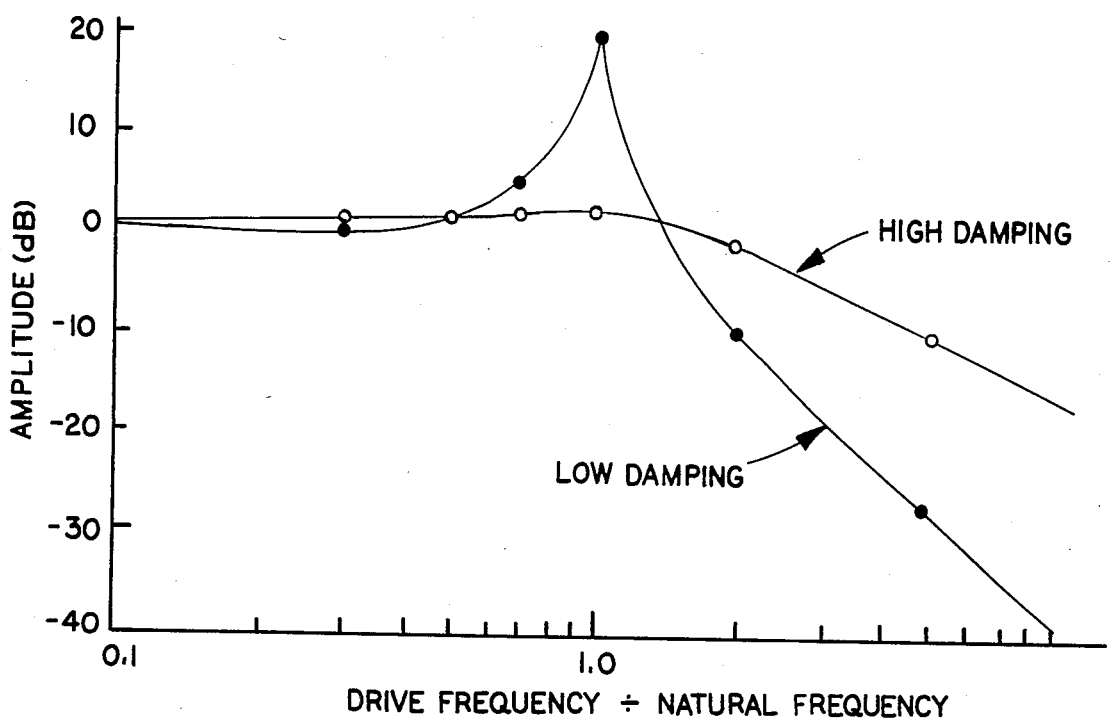
FIG. 5 is a graphic representation of the transmissibility of vibration in a mechanical coupler system particularly showing the responses of a high and low damped system.

With particular attention to FIG. 5, a graphical illustration of a viscous spring damper having a high damping and a low damping operational characteristic is illustrated. Changing the ratio of driving frequency to resonant frequency by a factor of 2, for example, from 5 to 10, would yield at least a six dB decrease in transmissibility of vibration. It may be seen that the decrease may extend as much as a 12 dB decrease. Industry standards provide a 10 dB value as reasonable.

Figure 6:
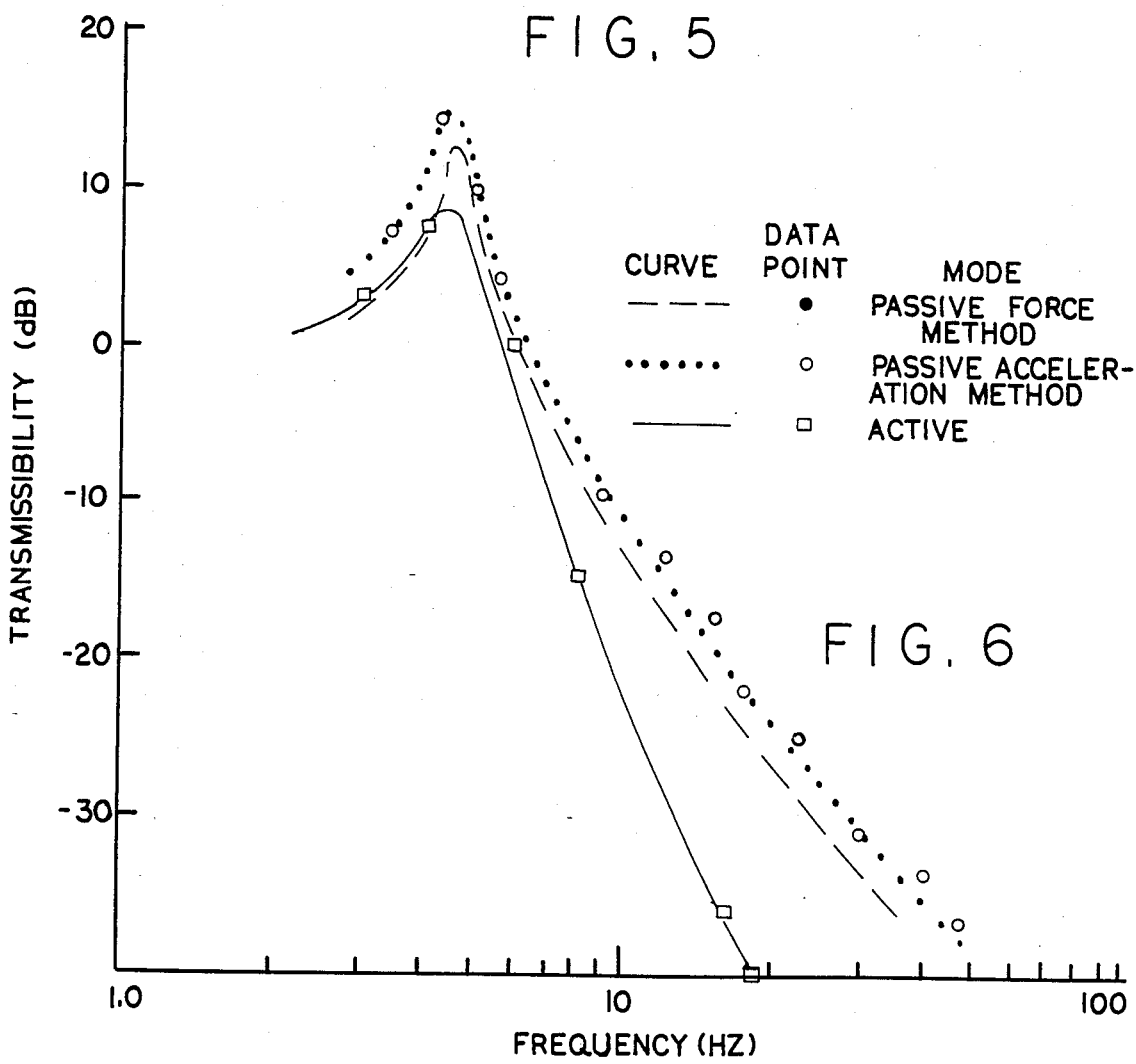
FIG. 6 is a graphic illustration showing the improved operational results of a vibration control system assembly formed in accordance with the present invention.

FIG. 6 provides the operational test results of an experimental test model of the invention. Three curves are shown representing three different operating procedures for the invention. The uppermost curve comprising a dotted curve illustrates the operating results of vibration transmissibility versus vibration frequency where a supporting platform was accelerated and neither the gas or fluid pressure of the viscous spring damper was dynamically adjusted to vary the dynamic coupling operation of the device. The middle curve illustrated in dash-line also illustrates a passive viscous spring damper coupler in that neither the gas or fluid pressure is dynamically adjusted. In addition, the dash-curve shows the operating characteristics where a force is applied to the supported item as opposed to accelerating the support platform. The third and lowermost curve illustrated by a solid curve shows the operating results of an active system, i.e., a system having a dynamically adjusted gas pressure chamber in the bladder of the viscous spring damper where the support platform was accelerated. The curve for the active mode of operation of the invention shows that reduction in the acceleration of the weight was achieved at all frequencies, with substantial reductions being realized at frequencies more than one octave above resonance. In the region around 20 hertz, the passive system showed the amplitude of vibration of the weight to be about 1/10 that of the platform, while the active system showed an amplitude of about 1/100 that of the platform.

The invention may be operated by merely providing dynamic adjustment of either the gas pressure in the viscous spring damper or the fluid pressure in the viscous spring damper. Mere adjustment of the gas pressure alone is simpler to accomplish in operation than dynamically adjusting the fluid pressure. However, the dynamic adjustment of both the fluid pressure and the gas pressure would provide the most effective operational attenuation of vibration and movement between the support platform and the supported item.

The invention has been described with reference to the preferred embodiment, obviously, modifications and alterations will occur to others upon the reading and understanding of the specification. It is our intention to include all such modifications and alterations insofar as they come within the scope of the appended claims or the equivalents thereof.

Having thus described the invention, we now claim:

1. A mechanical coupler control system comprising:
   a viscous spring damper including inner and outer members connected by an elastomeric shear spring, said damper having a main fluid chamber and a second fluid chamber, said main fluid chamber communicating with said second chamber in said inner member through a restrictor valve, said damper further having an expandible and contractible gas chargeable elastomeric bladder in said second chamber;
   a gas supply source for supplying gas to said bladder,
   a first selectively controllable servovalve operatively communicating said gas to supply source to said bladder;
   a means for sensing movement of an item to be mounted to said viscous spring damper in operative engagement with said item;
   first pressure transducer means for sensing the gas pressure in said bladder; and,
   logic circuit means for comparing an output of said means for sensing movement with first preselected reference values, for selectively operating said first servovalve in response to the output of said means for sensing movement and for comparing an output of said first pressure transducer means with second preselected reference values for selectively operating said first servovalve in response to the first pressure transducer means output to selectively adjust the load/deflection characteristics of said damper whereby gas pressure in said bladder is selectively controlled to adjust dynamic coupling operation of said damper.

2. The control system as defined in claim 1 including:
   a fluid supply source for supplying fluid to said main fluid chamber and said second fluid chamber;
   a second selectively controllable servovalve operatively communicating said fluid supply source to said main and said second fluid chambers;
   second pressure transducer means for sensing the fluid pressure in said fluid chambers; and,
   said logic circuit means further including means for selectively comparing an output of said second pressure transducer means with third preselected reference values for selectively operating said second servovalve in response to the second pressure transducer means output whereby fluid pressure in said fluid chambers is selectively controlled to adjust dynamic coupling operation of said damper.

3. The control system as defined in claim 2 wherein said first servovalve is electrically operable to communicate with said gas supply source, said gas supply source comprising a gas low pressure reservoir and a gas high pressure reservoir, said high pressure reservoir and said low pressure reservoir being selectively exclusively communicable to said bladder in response to the output of said pressure transducer and the output of said means for sensing movement.

4. The control system as defined in claim 3 wherein said logic circuit means includes means for computing selected gas pressure values and selected fluid pressure values for improved dynamic coupling operation of said damper.

5. An assembly for selectively adaptively controlling vibration, shock, acceleration and position of an item mounted to said assembly independent of varying operating characteristics of the item or a support base for said assembly comprising:
   an item to be controlled;
   a support platform for supporting said item;
   a viscous spring damper mechanically intercoupled between said item and said platform;
   first sensing means for sensing vibration, shock, acceleration and position of said item;
   second sensing means for sensing vibration, shock, acceleration and position of said support platform;
   a gas supply source for selectively supplying gas to said viscous spring damper;
   a fluid supply source for selectively supplying fluid to said viscous spring damper; and,
   logic control means operatively engaged to said first and said second sensing means, said gas supply source and said fluid supply source for comparing vibration, shock, acceleration and position of said item and said support platform and adjusting inputs from said gas supply source and said fluid supply source to selectively adjust the load/deflection operational characteristics of said viscous spring damper and the dynamic mechanical coupling of said item to said platform.

6. The assembly as claimed in claim 5 wherein valve means are disposed intermediate said gas supply source and said fluid supply source and said viscous spring damper, said valve means being operably engaged to said logic control means for selected operation thereby in response to signals from said first and said second sensing means.

7. In a vibration control system including a viscous spring damper having inner and outer members connected by an elastomeric shear spring and having a main fluid chamber therebetween communicating with a second chamber in said inner member through a restrictor valve, and further having an expandible and contractible gas chargeable elastomeric bladder in said second chamber, said members being relatively movable for stressing said shear spring and varying the volumes of said chambers while effecting fluid flow therebetween through the restrictor valve, the improvement comprising:

sensing means for sensing relative vibration of an item to be supported and a support platform therefor and means for varying the fluid pressure of said viscous spring damper and the gas pressure of said elastomeric bladder in operative communication with said sensing means to selectively adjust the load/deflection characteristics and the dynamic coupling operation of said vibration control system in response to the relative vibration.

8. The vibration control system as defined in claim 7 wherein said means for varying the fluid pressure comprises a logic control system and a servovalve in operative communication with said logic control system.

* * * * *